Figure 1:
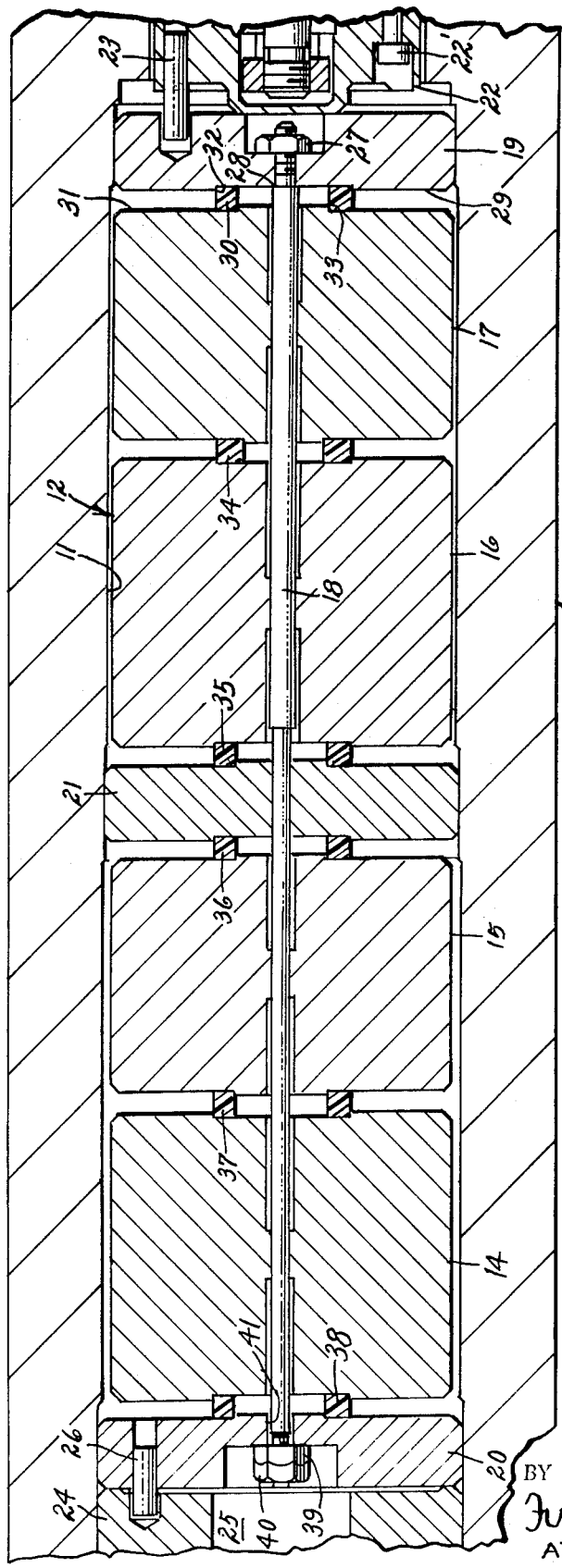
Figure 6:
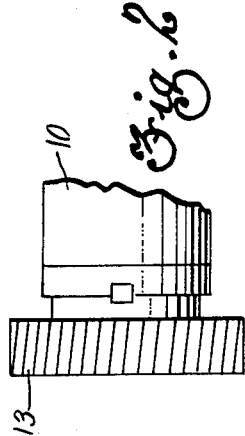

United States Patent
Aggarwal et al.

[15] 3,690,414
[45] Sept. 12, 1972

[54] VIBRATION ABSORBER FOR A SUPPORTED MEMBER

[72] Inventors: Trilok C. Aggarwal, Cincinnati; John R. Hasz, Milford, both of Ohio

[73] Assignee: Cincinnati Milacron Inc., Cincinnati, Ohio

[22] Filed: Nov. 4, 1970

[21] Appl. No.: 86,727

[52] U.S. Cl. ...................................188/1 B, 408/143
[51] Int. Cl. .................................................F16f 7/08
[58] Field of Search ......................188/1 B; 408/143

[56] References Cited

UNITED STATES PATENTS

| | | | |
|---|---|---|---|
| 2,960,189 | 11/1960 | Osburn | 188/1 B |
| 3,169,412 | 2/1965 | Weeks | 188/1 B X |
| 3,207,009 | 9/1965 | Carlstedt | 188/1 B UX |
| 3,242,791 | 3/1966 | Smith | 188/1 B |
| 3,559,512 | 2/1971 | Aggarwal | 408/143 |

Primary Examiner—Duane A. Reger
Attorney—Frank C. Leach, Jr.

[57] ABSTRACT

A series of damper dampens the vibrations in a bar extending from a quill of a bar milling machine with the damper damping each of a plurality of different natural frequencies of the extending bar depending upon the length of the extension of the bar from the quill. The damper includes a plurality of damper masses mounted on a rod with viscoelastic material between each of the adjacent damper masses and also between the supports for the rod and the adjacent damper masses. By selecting the weights of the masses and their locations on the rod, the length and diameter of the rod, and the stiffness of the viscoelastic material, the damper is designed to cover a wide frequency range, i.e., bar extension. The damper need not be tuned for each bar extension each time that the bar has a different extension since the plurality of damper masses permits the damper to dampen vibrations anywhere within the designed frequency range.

10 Claims, 2 Drawing Figures

PATENTED SEP 12 1972　　3,690,414

INVENTORS
TRILOK C. AGGARWAL
JOHN R. HASZ
BY
Frank C. Leach Jr.
ATTORNEY

VIBRATION ABSORBER FOR A SUPPORTED MEMBER

In bar type milling machines, the bar or spindle, which has the cutting tool mounted on one end thereof, has a relatively long axial feed stroke for performing a bore or a deep hole pocket in a workpiece. With the bar or spindle extended from the quill, the bar or spindle is subjected to vibrations. The most severe vibrations are produced by the cutting process. These vibrations are always near the natural frequency of the bar. Furthermore, the natural frequency of vibration of the bar or spindle varies in accordance with the length that the bar or spindle extends from the quill. Thus, as the length of the extension of the bar increases, the natural frequency decreases.

Accordingly, if the bar extension or spindle extends from the quill different distances during various machining operations, the bar extension or spindle is subjected to vibrations of different frequencies. Therefore, it is not possible to employ a single damper for the various frequencies at different extensions of the bar or spindle.

It has previously been recognized in U.S. Pat. No. 3,486,585 to Richter et al. that a machine tool can have the support member for the cutting tool subjected to different natural frequencies of vibrations depending upon the particular set-up, the location of the cutting tool and the workpiece, and similar factors. In the aforesaid Richter el al. patent, the vibration absorber or damping means has used viscoelastic members cooperating with a damper mass with the stiffness of the viscoelastic members being changed to alter the frequency to which the vibration absorber is tuned.

The present invention is an improvement over the aforesaid Richter et al. patent since a series damper is employed and is capable of absorbing vibrations of different natural frequencies of the extending bar or spindle without any adjustment of the elements of the damper. Accordingly, the series damper of the present invention has particular utility in a machine tool in which the support for the cutting tool extends varying distances from the quill, for example. Thus, the vibration absorber of the present invention is capable of preventing vibrations in a bar or spindle, which supports the cutting tool, at different extensions from its quill.

The vibration absorber of the present invention absorbs vibrations over a range of frequencies through the vibration absorber being designed so that it has a plurality of unique frequencies at which it most efficiently absorbs the vibrations of the bar or spindle through being tuned thereto with these frequencies being selected so that there is an overlapping of the frequency range at which each of these unique frequencies can effectively dampen vibrations. Thus, if the vibration absorber has two unique frequencies, then these two frequencies would be selected so that a percentage of these two unique frequencies would overlap. For example, the two unique frequencies could be selected so that the vibrations absorber could effectively absorb any frequency therebetween if 80 percent of the higher of the unique frequencies overlapped 120 percent of the lower unique frequency.

The present invention utilizes a plurality of damper masses arranged in one or more series of at least two dampers each. The number of the damper masses depends upon the range of frequencies that the vibration absorber of the present invention is to effectively dampen.

The number of damper masses of the vibration absorber of the present invention is equal to the number of unique frequencies to which the vibration absorber is tuned. That is, if there are four damper masses, for example, then there are four natural frequencies of vibration of the bar or spindle that the vibration absorber most efficiently absorbs and to which the vibration absorber is tuned.

At the natural frequencies of the bar or spindle that differ from the frequencies to which the vibration absorber is tuned but are within the range of frequencies for which the vibration absorber of the present invention is designed, there is sufficient damping to prevent vibration. By selecting a sufficient number of the damper masses to effectively cover the frequency range of the bar or spindle so that one of the unique frequencies of the damper is sufficiently close thereto for effective damping, the vibration absorber of the present invention is capable of absorbing the vibrations of the bar within a wide range of frequencies.

In the present invention, the spring stiffnesses of the damper mass supports depend upon both the stiffness of the viscoelastic material, which is disposed on each side of each of the damper masses for cooperation therewith, and the stiffness of a rod, which supports all of the damper masses. Thus, the series damper of the present invention employs both the stiffness of the viscoelastic material and the stiffness of the rod for the required spring stiffness for a particular frequency of vibration. Accordingly, by changing the diameter of the rod, for example, the spring stiffness of the damper is changed so that the natural frequencies of the series damper are different than they would be for another diameter of the rod.

It is necessary that there be at least two damper masses cooperating with each other to form the series of damper masses. Thus, when the damper masses move in the same direction, the damper is tuned to vibrations of one frequency while movement of the damper masses in the opposite direction results in the damper absorbing vibrations of a second and different frequency.

For satisfactory operation, the weight of each of the damper masses should not be less than 10 per cent of the maximum effective weight of the bar or spindle which supports the series damper and the cutting tool. Thus, it may be necessary to use a heavier density metal to increase the damper mass for the available space in the bar or spindle. One suitable example of such a material is a high density tungsten alloy sold under the trademark Kennertium. This material has a specific weight of 0.66 pounds/inch$^3$.

An object of this invention is to provide a vibration absorber for absorbing any vibration created in a supported member within a particular frequency range.

Another object of this invention is to provide a vibration absorber for absorbing any of the vibrations within the frequency range created in an extensible member, which supports a cutting tool, in a machine tool.

A further object of this invention is to provide a damper to prevent self-excited vibrations in an extensible member, which supports a cutting tool, in a machine tool at different extensions of the extensible member.

Other objects of this invention will be readily perceived from the following description, claims, and drawing.

This invention relates to a vibration absorber for a supported member subject to vibrations and the absorber absorbing vibrations of the supported member within a range of frequencies. The absorber includes damping means supported by the supported member. The damping means includes series damping means to absorb vibrations of the supported member within a range of frequencies of vibration.

The attached drawing illustrates a preferred embodiment of the invention, in which:

FIG. 1 is a sectional view of a portion of an extensible bar or spindle of a machine tool having the vibration absorber of the present invention supported therein; and FIG. 2 is a side elevational view of a portion of the spindle, which has the vibration absorber of the present invention supported therein, with the cutting tool thereon.

Referring to FIGURE 1, there is shown a bar or spindle 10, which is movable axially relative to a quill in the manner such as that more particularly shown and described in the copending patent application of Herman J. Baldwin for "Machine Tool Spindle Apparatus," Ser. No. 775,701, filed Nov. 14, 1968, now U.S. Pat. No. 3,548,711, and assigned to the same assignee as the assignee of the present application. The bar or spindle 10 is not only moved axially relative to the quill but also is rotated in the manner more particularly shown and described in the aforesaid Baldwin application.

The bar or spindle 10 has a stepped bore 11 therein and communicating with the end of the bar or spindle 10 at which a cutting tool 13 (see FIG. 2) is disposed. The bore has a vibration absorber 12, which is a series damper, disposed therein.

The vibration absorber 12 includes four axially spaced damper masses 14, 15, 16, and 17. The damper masses 14–17 are supported on a rod 18, which has one end supported by a rod support 19 and its other end supported by a rod support 20. The damper masses 14–17 may be slidably or press fitted on the rod 18, which is supported intermediate its ends by a rod support 21 that slidably receives the rod 18.

The rod support 19 is secured to a support plug 22, which is connected to the bar or spindle 10 by screws (one shown at 22') to cause rotational movement therewith, by a pin 23. The support plug 22 has a portion of heat expansion determining means secured thereto as more particularly shown and described in the copending patent application of Lewis A. Dever for "Heat Expansion Determining Means," Ser. No. 775,702, filed Nov. 14, 1968, now U.S. Pat. No. 3,581,533, and assigned to the same assignee as the assignee of the present application.

The end rod support 20 is secured to a tool holder 24, which has a bore 25 therein to receive the cutting tool 13 and is fixed to the bar or spindle 10 by screws (not shown) for rotation therewith. The end rod support 20 is connected to the tool holder 24 by a pin 26.

One end of the rod 18 is retained within the end rod support 19 by a nut 27 cooperating with the threaded end of the rod 18. The end of the rod 18 is reduced so that the rod 18 has a shoulder 28 bearing against an end surface 29 of the end rod support 19. Thus, the rod 18 is releasably connected to the end rod support 19 by the nut 27 so as to not move relative thereto.

A ring 30, which is formed of a viscoelastic material such as polyvinyl chloride, for example, is disposed between the end surface 29 of the end rod support 19 and an adjacent end surface 31 of the damper mass 17. The ring 30 is retained concentrically to the rod 18 by having its outer surface bear against an annular shoulder 32 in the end surface 29 of the end rod support 19 while its inner surface bears against an annular shoulder 33 in the end surface 31 of the damper mass 17.

The adjacent surfaces of the damper masses 16 and 17.

The adjacent surfaces of the damper masses 16 and 17 have a ring 34 disposed therebetween and supported concentrically with respect to the rod 18 in the same manner as the ring 30 is supported. The ring 34 is formed of a viscoelastic material, which may be the same as the ring 30.

A ring 35, which is preferably formed of the same viscoelastic material as the ring 30, is disposed between one end surface of the intermediate rod support 21 and the adjacent end surface of the damper mass 16. The ring 35 is supported concentrically to the rod 18 in the same manner as the rings 30 and 34.

The other end surface of the end rod support 21 and the adjacent end surface of the damper mass 15 have a ring 36, which is formed of a viscoelastic material that may be the same as the rings 30 and 35, disposed therebetween and concentrically supported with respect to the rod 18 in the same manner as the rings 30, 34, and 35. A ring 37, which is formed of a viscoelastic material that may be the same as the ring 36, is supported between the adjacent end surfaces of the damper masses 14 and 15. The ring 37 also is concentrically located with respect to the rod 18.

A ring 38, which is preferably formed of the same viscoelastic material as the ring 36, is disposed between one end surface of the end rod support 20 and the adjacent end surface of the damper mass 14. The ring 38 is concentrically supported with respect to the rod 18 in the same manner as is the ring 30.

Since one end of the rod 18 is releasably connected to the end support 19 as previously mentioned, the preload on the rings 30 and 34–38 is controlled through nuts 39 and 40, which cooperate with the threaded end at the other end of the rod 18 from the nut 27. The end rod support 20 has a passage 41 through which the rod 18 extends. Accordingly, different preloads may be exerted on the rings 30 and 34–38 as desired since the end rod support 20 can be adjusted relative to the end rod support 19.

The intermediate rod support 21 serves to isolate the damper masses 14 and 15 from the damper masses 16 and 17 since the rod 18 cannot bend through the intermediate rod support 21 due to the tight fit of the rod 18 within the passage in the intermediate rod support 21. Thus, the damper masses 14 and 15 form a first set of dampers while the damper masses 16 and 17 form a second set of dampers.

The damper masses 14 and 15, which form the first set of series dampers, cooperate to cause the vibration absorber 12 to be tuned to two natural frequencies of the bar or spindle 10 while the damper masses 16 and 17, which form the second set of series dampers, cooperate to cause the vibration absorber 12 to be tuned to two other natural frequencies of the bar or spindle 10. The vibration absorber 12 is capable of effectively absorbing the vibrations of the bar or spindle 10 at a range of frequencies on each side of the four natural frequencies.

Accordingly, by selecting the damper masses 14 to 17, these frequency ranges overlap so that the vibration absorber 12 can effectively absorb vibrations throughout the range between the four natural frequencies to which the vibration absorber is tuned and a percentage of frequencies higher than the highest of the four natural frequencies and a percentage of frequencies lower than the lowest of the four natural frequencies. For example, the highest of the four natural frequencies to which the vibration absorber 12 is tuned could be exceeded by 20 per cent and the vibration absorber 12 would still effectively dampen vibrations at this frequency. Likewise, the lowest of the four natural frequencies to which the vibration absorber 12 is tuned could be reduced by 20 per cent, and the vibration absorber 12 would effectively absorb a vibration at this lower frequency.

One of the four natural frequencies to which the vibration absorber 12 is tuned is determined when both of the damper masses 14 and 15 move in the same direction and with the same amplitude. At this time, there is friction on the rings 36 and 38 but there is no friction on the ring 37 since there is no relative movement of the adjacent surfaces of the damper masses 14 and 15. This movement produces one deflection of the rod 18 between the rod supports 20 and 21 whereby the vibrations at one frequency range, which varies a percentage on each side of the natural frequency of the vibration absorber 12 when the damper masses 14 and 15 move in the same direction and with the same amplitude, of the bar or spindle 10 are absorbed by the vibration absorber 12. For this frequency, the spring stiffness of the damper is formed by the stiffness of only the rings 36 and 38 and the stiffness of the rod 18 between the rod supports 20 and 21.

A second of the four natural frequencies to which the vibration absorber 12 is tuned is that produced by the damper masses 14 and 15 moving in opposite directions and with the same amplitude. At this time, all of the rings 36–38 are effective to produce a portion of the spring stiffness of the damper along with the portion of the rod 18 between the rod support 20 and 21. Since the damper masses 14 and 15 move in opposite directions in this mode, the vibration absorber 12 absorbs vibrations of a different frequency range of the bar or spindle 10 than when the damper masses 14 and 15 move in the same direction.

In a similar manner, the damper masses 16 and 17 form a second set of dampers in which the damper masses 16 and 17 can move in the same direction or opposite directions to absorb the vibrations of the other two of four ranges of frequencies of the bar or spindle 10. When the damper masses 16 and 17 move in the same direction and with the same amplitude, the ring 34 does not supply any of the spring stiffness since there is no relative movement between the adjacent surfaces of the damper masses 16 and 17. When the damper masses 16 and 17 move in the same direction and with the same amplitude, only the rings 30 and 35 function to provide a portion of the spring stiffness for the damper masses 16 and 17 along with the portion of the rod 18 between the end rod support 19 and the intermediate rod support 21.

When the damper masses 16 and 17 move in opposite directions and with the same amplitude, the ring 34 also becomes effective so that a different spring stiffness is produced. Thus, when the damper masses 16 and 17 move in opposite directions, the vibrations of a fourth range of frequencies of the bar or spindle 10 are absorbed by the vibration absorber 12.

As shown in FIG. 1, the weights of the damper masses 14 and 15 are different although they could be the same. Likewise, as shown in FIG. 1, the damper masses 16 and 17 are different weights although they could be the same.

In the embodiments shown, the damper masses 14 and 16 have the same weights, and the damper masses 15 and 17 have the same weight. However, this is not a requisite for satisfactory operation.

Furthermore, while the vibration absorber 12 has been shown as comprising two sets of damper masses with each set comprising two damper masses, it should be understood that such is not a requisite for satisfactory operation. Thus, the vibration absorber 12 could comprise a single set of three or more damper masses if desired. The only limit is the physical limitations imposed by the hardware.

It should be understood that the vibration absorber 12 has the number of frequencies of vibrations equal to the number of the damper masses. Thus, with four of the damper masses as shown, the vibration absorber 12 has four different natural frequencies.

When the natural frequency of the bar or spindle 10 coincides with one of the natural frequencies of the vibration absorber 12, the best tuning condition exists to provide the best reduction in vibration. If the natural frequency of the bar or spindle 10 does not coincide exactly with one of the natural frequencies of the vibration absorber 12, as would generally be the case, reductions in vibrations are experienced; however, the degree of improvement is less. Therefore, it is desirable to have enough damper masses to cover the desired frequency range with small differences between respective natural frequencies of the absorber masses. Thus, at any bar or spindle natural frequency, the absorber 12 will be at or very near one of its natural frequencies. When this occurs, substantial reductions in vibration amplitude are produced.

Since the vibration of the particular frequency to which the vibration absorber 12 is tuned is dependent upon the square root of the ratio of the combined stiffness of the rod 18 and the stiffness of the rings of viscoelastic material to the mass of the damper mass, there are numerous ways in which the elements of the vibration absorber 12 can be altered to be tuned to vibrations of different natural frequencies so as to absorb a different frequency range. For example, the length and/or the diameter of the rod 18 can be varied. Likewise, the surface area of the rings of the viscoelastic material and/or the thickness of the material can be varied. However, the viscoelastic material of the rings must supply not less than 50 per cent of the total stiffness required of the vibration absorber 12 for any particular frequency in order to assure adequate damping effect from the viscoelastic material. Furthermore, the weight of any of the damper masses 14–17 can be varied.

While the present invention has shown the rod 18 as having two different diameters, it should be understood that such is not a requisite for satisfactory operation of the vibration absorber 12 although this aids in assembling the vibration absorber 12. Thus, the rod 18 can be the same diameter throughout its length, and the vibration absorber 12 could be tuned to four different natural frequencies of the bar or spindle 10 through controlling the length of the rod 18 and the sizes, both thickness and area, of the rings 30 and 34–38.

It is necessary that the loss factor, which is the ability of the viscoelastic material to absorb the vibration energy, of the viscoelastic material forming the rings 30 and 34–38 be between 0.6 to 0.8. Therefore, the particular viscoelastic material, which forms each of the rings 30 and 34–38, must be selected so that the loss factor of the viscoelastic material remains within the desired range. Then, when the rings supply at least 50 per cent of the stiffness, they will in turn supply the desired damping to the damper.

Accordingly, to absorb vibrations at the four different frequencies of the bar or spindle 10, the diameter of the rod 18, the length of the rod 18, the weight of each of the damper masses 14–17, the viscoelastic material forming each of the rings 30 and 34–38, and the thickness and area of each of the rings 30 and 34–38 must be selected. Thus, it is first necessary to determine the range of natural or critical frequencies of the bar or spindle 10 in accordance with different extensions thereof from the quill and then determine the number of critical frequencies required to cover this range. In this case, four.

The effective weights of the bar or spindle 10 at the different extensions from the quill are next determined. Then, there is determined the maximum geometric size of the vibration absorber 12 that can be installed in the bar or spindle 10. The weight of each of the damper masses 14–17 is computed with each having a weight no less than 10 per cent of the maximum effective weight of the bar or spindle 10.

To determine the diameter of the rod 18 and the type of the viscoelastic material of each of the rings 36–38 for the set of the damper masses 14 and 15 with a given length of the rod 18 between the rod supports 20 and 21, there are computed the deflections at the center of the mass of each of the damper masses 14 and 15 of the set when both deflect in the same direction with the same amplitude. From this, the moment of inertia of the rod 18 between the rod supports 20 and 21 can be determined for a particular frequency of the rod 18 when only the stiffness of the rod 18 is considered. This produces a particular diameter of the rod 18 between the supports 20 and 21.

Then, the stiffness of the rod 18 is calculated in accordance with the particular frequency that is to be absorbed. Next, the stiffness of the viscoelastic material of the outer rings 36 and 38 is calculated.

To obtain the desired stiffness of the viscoelastic material of the rings 36 and 38, the selection of the viscoelastic material of the rings 36 and 38 is made from a nomograph. With a thickness selected for the rings 36 and 38, the area of the rings 36 and 38, with the rings 36 and 38 formed of a particular viscoelastic material, is then determined so that the viscoelastic material has the desired stiffness.

It is then necessary to ascertain that the loss factor, which is the ability of the material to absorb energy, of the thickness of the selected viscoelastic material for the rings 36 and 38 is within the range of 0.6 to 0.8. If this is met, then the selected thicknesses of the rings 36 and 38 for the particular viscoelastic material are satisfactory. However, if the loss factor should not be satisfactory, then it would be necessary to select another viscoelastic material or a different thickness of the viscoelastic material.

The same type of calculations would be made for the set of the damper masses 14 and 15 when the damper masses 14 and 15 would be deemed to move in opposite directions with respect to the rod supports 20 and 21 rather than in the same direction and with the same amplitude. This would be used to calculate a different stiffness for the center ring 37. The ring 37 would preferably have the same thickness as the rings 36 and 38 but the ring 37 must have a different area to obtain the desired stiffness of the viscoelastic material of the center ring 37.

Similar calculations would be made for the set of the damper masses 16 and 17 with the damper masses 16 and 17 moving with the same amplitude in the same direction and with the same amplitude in opposite directions with respect to the supports 19 and 21 for the rod 18. Thus, this could result in a different diameter of the rod 18 or different areas of the outer rings 30 and 35 and/or the center ring 34.

Since the above calculations were based upon the masses of a set being equal and the rod 18 having the same diameter throughout each set (The diameter of each set does not have to be the same.), they must be considered only approximate. They are used to obtain the first engineering approximation for these parameters. The final calculation for the set of the damper masses 14 and 15 is made using the formula $$f^2 = \frac{1}{2}[(k_1+k/m_1)+(k_2+k/m_2) \pm \{[(k_1+k/m_1)-(k_2+k/m_2)]am^2 + 4(k^2/m_1m_2)\}^{1/2}]$$

where $f$ is the natural frequency in radians per second, $m_1$ is the mass 14, $m_2$ is the mass 15, $k_1$ is the combined stiffness of the rod 18 and the ring 38, $k_2$ is the combined stiffness of the rod 18 and the ring 36, $k$ is the combined stiffness of the rod 18 and the ring 37.

If these natural frequencies do not correspond to the selected frequency, then $k_1$, $k_2$, and $k$ must be changed until agreement is obtained. Similar calculations are made for the damper masses 16 and 17 with appropriate substitution in the foregoing formula.

It should be understood that the viscoelastic material of the center ring could have different properties than the viscoelastic material of the outer rings for any particular set of the damper masses and the outer rings of the particular set also could be formed of viscoelastic materials of different properties. Likewise, the viscoelastic materials of the rings for each set of the damper masses could have different properties.

While the rings 30 and 34–38 have been shown as being continuous, it should be understood that they could be arcuate segments, for example, if desired. It is not necessary that the rings be supported by the shoulders in the adjacent surfaces of the members of the vibration absorber 12 since any other means for holding each of the rings 30 and 34–38 concentrically with respect to the rod 18 may be employed. For example, each of the rings could be supported by a button mounting arrangement such as that shown and described in the copending patent application of Robert C. Richter et al for "Tuned Damping Means For Increasing The Minimum Dynamic Stiffness Of A Spindle System," Ser. No. 886,063, filed Dec. 18, 1969, now U.S. Pat. No. 3,643,546, and assigned to the same assignee as the assignee of the present application.

The damper masses 14–17 have been shown as cylindrical. However, it should be understood that the damper masses 14–17 may have any shape.

While there have been shown two sets of two damper masses, it should be understood that each set may have any number of damper masses. It is not necessary that each set have the same number of damper masses.

While the present invention has been shown and described with respect to a bar milling machine, it should be understood that the vibration absorber of the present invention may be readily employed with any vibratory supported element or member, which vibrates, irrespective of whether the member is cantilever supported or not and irrespective of whether the member has a cutting tool supported thereon. One example of a cantilever member without a tool is a tracer bracket for a tracing machine in which the damper would be employed to reduce the vibratory effect on the machine tool. Thus, the invention has utility to control vibrations in any supported member that vibrates.

An advantage of this invention is that there is no tuning necessary for different extensions of the bar or spindle from the quill after the vibration absorber has been mounted in the bar or spindle. Another advantage of this invention is that the vibration absorber enables a bar or spindle to be disposed at different extensions from a quill without any vibrations being created therein whereby more efficient machining can occur.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. A vibration absorber for a supported member subject to vibrations of different frequencies and said absorber absorbing vibrations of the supported member within a range of frequencies, said absorber including:
    damping means supported by the supported member;
    and said damping means including:
        a plurality of separate damper masses disposed within the supported member and forming at least one series damper;
        a rod supported within the supported member and supporting said damper masses;
        and viscoelastic means cooperating with each of said damper masses, said viscoelastic means and said rod cooperating to absorb vibrations of the supported member within a range of frequencies of vibration.

2. The vibration absorber according to claim 1 in which each of said damper masses of said damping means has a weight equal to at least 10 percent of the maximum effective weight of the supported member.

3. The vibration absorber according to claim 1 including:
    means to support each end of said rod;
    and means to connect each of said end rod support means to the supported member.

4. The vibration absorber according to claim 3 in which said viscoelastic means is disposed between each of said end rod support means and the adjacent of said damper masses and between each adjacent pair of said damper masses of the same series damper.

5. The vibration absorber according to claim 4 including:
    at least one rod support means disposed intermediate the ends of said rod;
    said damper masses being supported on said rod to form at least two series dampers with each of the series dampers being separated from the adjacent series damper by said intermediate rod support means;
    and said viscoelastic means is disposed between said intermediate rod support means and said damper mass on each side thereof.

6. The vibration absorber according to claim 5 including:
    means to connect said rod to each of said end rod support means;
    and means to adjust the preload on said viscoelastic means by adjusting the connection of said rod to one of said end rod support means.

7. The vibration absorber according to claim 5 in which said rod has a first diameter between one of said end rod support means and said intermediate rod support means and a second diameter, different than the first diameter, between the other of said end rod support means and said intermediate rod support means.

8. The vibration absorber according to claim 1 in which each of said damper masses has a cylindrical shape.

9. The vibration absorber according to claim 1 in which each of said viscoelastic means comprises a single element of viscoelastic material concentrically disposed with respect to said rod.

10. The vibration absorber according to claim 1 including means to adjust the preload on said viscoelastic means.

* * * * *

UNITED STATES PATENT OFFICE
CERTIFICATE OF CORRECTION

Patent No. 3,690,414                    Dated September 12, 1972

Inventor(s) Trilok C. Aggarwal, et. al.

It is certified that error appears in the above-identified patent and that said Letters Patent are hereby corrected as shown below:

In the Abstract, line 1, cancel "of". Column 1, line 62, "vibrations" should be -- vibration -- . Column 3, line 41, after "bore", insert -- 11 -- ; line 56, after "of", insert -- a -- . Column 4, cancel lines 19 and 20; line 51, after "end", insert -- rod -- . Column 8, the formula appearing on lines 48 and 49 should read as follows:

$$f^2 = \frac{1}{2}\left[\frac{k_1 + k}{m_1} + \frac{k_2 + k}{m_2} \pm \left\{\left[\frac{k_1 + k}{m_1} - \frac{k_2 + k}{m_2}\right]^2 + 4\frac{k^2}{m_1 m_2}\right\}^{1/2}\right]$$

Signed and sealed this 1st day of May 1973.

(SEAL)
Attest:

EDWARD M. FLETCHER, JR.                  ROBERT GOTTSCHALK
Attesting Officer                        Commissioner of Patents